US011620365B2

(12) United States Patent
Coleman et al.

(10) Patent No.: US 11,620,365 B2
(45) Date of Patent: Apr. 4, 2023

(54) SALTING TEXT IN DATABASE TABLES, TEXT FILES, AND DATA FEEDS

(71) Applicant: LiveRamp, Inc., San Francisco, CA (US)

(72) Inventors: Arthur Coleman, Carmel Valley, CA (US); Tsz Ling Christina Leung, Foster City, CA (US); Michael Anderson, Conway, AR (US); Matt LeBaron, Salinas, CA (US); Martin Rose, Superior, CO (US)

(73) Assignee: LiveRamp, Inc., San Francisco, CA (US)

( * ) Notice: Subject to any disclaimer, the term of this patent is extended or adjusted under 35 U.S.C. 154(b) by 231 days.

(21) Appl. No.: 17/236,104

(22) Filed: Apr. 21, 2021

(65) Prior Publication Data

US 2021/0326414 A1      Oct. 21, 2021

Related U.S. Application Data

(62) Division of application No. 16/067,457, filed as application No. PCT/US2016/068418 on Dec. 22, 2016, now Pat. No. 11,003,747.

(Continued)

(51) Int. Cl.
*G06F 21/16* (2013.01)
*G06F 7/10* (2006.01)
(Continued)

(52) U.S. Cl.
CPC ............. *G06F 21/16* (2013.01); *G06F 7/10* (2013.01); *G06F 16/00* (2019.01); *G06F 21/604* (2013.01);
(Continued)

(58) Field of Classification Search
CPC . G06F 21/16; G06F 7/10; G06F 16/00; G06F 21/604; G06F 21/6218; G06F 2221/0737
See application file for complete search history.

(56) References Cited

U.S. PATENT DOCUMENTS 8,046,827 B2 * 10/2011 Corella .................. G06F 21/31
713/168
10,013,422 B2 * 7/2018 de Seabra ........... G06F 16/1748
(Continued)

FOREIGN PATENT DOCUMENTS

| CN | 109429517 A | * | 3/2019 | ............. G06F 21/10 |
| CN | 108111303 B | * | 6/2021 | ............... H04L 9/08 |
| WO | WO 2018/162628 A1 | * | 9/2018 | ............... H04L 9/32 |

OTHER PUBLICATIONS

Zinsmeyer et al, translated portion of CN 109429517 A, Mar. 5, 2019, 1 page.*
Zhang, translated portion CN 108111303 B, Jun. 6, 2021, 1 page.*

*Primary Examiner* — Christopher A Revak

(57) ABSTRACT

A system for "horizontal" salting of database tables, text files, and data feeds utilizes a key field and character position within that field (the "Key Character") and a Salting Field, which contains content that can legitimately be in one of at least two states without impacting the usefulness of the data. A unique identifier, which is assigned to the recipient of the data, is hidden within the data by using the variations of the states in the Salting Field, with the value of the Key Character identifying the position within the unique identifier. This type of salting is invisible to the recipient of the data file, does not alter the accuracy of the data, and can be made unique for a particular party receiving data files or unique for each data file.

3 Claims, 3 Drawing Sheets

Related U.S. Application Data

(60) Provisional application No. 62/274,137, filed on Dec. 31, 2015.

(51) Int. Cl.
    *G06F 16/00*     (2019.01)
    *G06F 21/60*     (2013.01)
    *G06F 21/62*     (2013.01)

(52) U.S. Cl.
    CPC .. *G06F 21/6218* (2013.01); *G06F 2221/0737* (2013.01)

(56) References Cited

U.S. PATENT DOCUMENTS

| | | | |
|---|---|---|---|
| 10,713,380 B1* | 7/2020 | Langseth | G06F 16/2456 |
| 11,265,148 B1* | 3/2022 | Griffin | H04L 9/0643 |
| 11,350,147 B2* | 5/2022 | Coleman | H04L 63/126 |
| 2002/0141593 A1* | 10/2002 | Kurn | H04L 9/085 |
| | | | 380/286 |
| 2015/0149208 A1* | 5/2015 | Lynch | G16H 10/60 |
| | | | 705/3 |
| 2018/0227130 A1* | 8/2018 | Ebrahimi | H04L 9/3247 |

\* cited by examiner

SALTING TEXT IN DATABASE TABLES, TEXT FILES, AND DATA FEEDS

CROSS-REFERENCE TO RELATED APPLICATIONS

This application is a divisional of U.S. patent application Ser. No. 16/067,457, filed on Jun. 29, 2018, which in turn was a national stage entry of international patent application no. PCT/US2016/068418, filed on Dec. 22, 2016, which in turn claimed priority to U.S. provisional patent application No. 62/274,137, filed on Dec. 31, 2015. All of the foregoing applications are incorporated herein by reference in their entirety.

TECHNICAL FIELD

The field of the invention is the salting of data to determine if data has been inappropriately copied or used, and in particular to the salting of consumer data for such purpose. Salting is the mechanic of inserting unique data (salt) into a subset of data so that, in the case that the data is leaked, the data contained in the subset of data may be identified back to the data owner.

BACKGROUND ART

References mentioned in this background section are not admitted to be prior art with respect to the present invention.

Data leakage may be defined as the surreptitious use of data by someone other than an owner or authorized user. The financial impact of data leakage is estimated to be in the hundreds of millions of dollars annually worldwide, and thus represents a very significant problem in the data services industry. Solutions attempting to prevent data leakage have existed for some time. These solutions prevent data from leaking outside an organization's firewall, or encrypt it when it leaves the firewall and moves on open networks "on the wire." Solutions have also existed for asserting ownership of graphical, video, audio, or document (i.e., text or pdf) data once that data is actually exposed in the clear outside the firewall; organizations use these "digital watermarking" solutions, as they are known, to protect their data from misuse. (The term "watermarking" is borrowed from print media, where watermarks consist of imprinting images or patterns on printed documents to verify authenticity, whereas a digital watermark is a kind of marker embedded in a digital file to serve the same purpose.) Watermarks allow the data owner to recover damages for unlicensed use, because they can use the watermark in a court of law as evidence of ownership and copyright infringement. At the same time, the fact that such legal remedies exist deters individuals or groups hoping to acquire and then use that copyrighted material for free.

Sadly, data leakage of text and database files, whether passed in the clear or decrypted at the point of use, has remained an unsolved problem. Owners of consumer data ("Data Owners") often give, lease, or sell their data to individuals or organizations ("Trusted Third Parties" or "TTPs") that are trusted to use that data only in a legal fashion, following contractual requirements or data-handling regulations, such as Regulation B in financial services or privacy laws set by local, state or federal governments. This data is usually transmitted as a series of database tables (e.g., .sql format), text files (e.g., .csv, .txt, .xls, .doc, and .rtp format), or as a real-time data feed (e.g., XML or JSON). Despite this, it often occurs that the Data Owner's data leaks (the leaked file is defined herein as a "Leaked Subset") into the hands of others ("Bad Actors") who either knowingly or unknowingly use the data without proper permission or even illegally. This can happen because, for example, a TTP knowingly releases the data and is itself a Bad Actor; an employee of the TTP knowingly or accidentally releases the data; or an employee of the Data Owner itself knowingly or unknowingly leaks the data.

Watermarking of databases, text files or real-time data feeds (e.g., XML or JSON) presents unique challenges. Images, videos or audio files are dense and highly structured. It is easy to embed a small amount of data as a watermark in these files without degrading the file's information content or user experience, because these types of files are noise resistant. A noise resistant file is one in which a bit of noise (such as a watermark) can be added without degrading the resulting data; for example, watermarks can be added to video files by altering a few bits of data or altering the order of adjacent frames without the viewer noticing the change. At the same time, the highly-structured nature of this type of data makes it difficult for a Bad Actor to remove the watermark. Database, text files or real-time data feeds (e.g., XML or JSON), by comparison, are relatively lightweight, and thus are intolerant to the introduction of noise. For example, changing even a single character in a name or address may cause the data in that record to be useless. The structure of this type of data can easily be manipulated in ways (e.g., reordering columns, appending rows, deleting rows) that make a watermark fragile, easy to detect, and therefore easy to make unrecognizable to the party seeking to establish that the data has been improperly used. For example, elements within a data table can be altered; data can be merged with data from other data sources; and data can be divided into subsets and/or rearranged and manipulated in other ways to avoid detection. As a result, significant obstacles exist for a Data Owner who wants to assert ownership of a database or text file (or its JSON or XML equivalent) and/or detect the party responsible for leaking the data. Nor can a Data Owner easily recover lost revenue through action at law, because it lacks proof of the wrongful conduct that meets applicable evidentiary standards. Moreover, current methods for detecting data leaks are primarily through manual operations and are thus time-consuming, labor-intensive, expensive, and error-prone. An improved system and method of watermarking or "salting" these types of files would thus be of great benefit.

DISCLOSURE OF INVENTION

The invention is directed to a method for salting (or applying a watermark) to database tables, text files, data feeds (e.g., XML or JSON), and like data, which is referred to herein as "horizontal" salting. Horizontal salting is a watermarking mechanic developed by the inventors hereof whereby a tiny number of unique and identifiable changes are made on a full set or subset of data. Horizontal salting impacts a data file or data feed based on two components: a key field and character position within that field, which is evaluated; and a salting field, which contains content that can be legitimately in one of at least two states without impacting the usefulness of the data. These components can, in various embodiments, be the same field or different fields in a record. In certain embodiments, the key character may have a wide variety of values, such as the full range of alphanumeric characters. The term "horizontal" salting is coined here because the changes are made to individual records of data, which are often depicted as individual rows when data files are arranged in a tabular format; therefore, the salting is "horizontal" in the sense that the manipulation takes place in a row-by-row methodology. The result of this approach is that, as will be explained below, it is not necessary to analyze an entire file or data feed to find the salt, but rather it is necessary only to analyze a small number of rows or in some cases even one row. This greatly improves the computational speed of the process.

The horizontal salting system according to certain implementations of the invention described herein adheres to the following principles:

1. Limiting Perturbation. Every form of watermarking except fingerprinting involves some perturbation of data. The question is how much perturbation can be inserted into a database, text file or real-time data feed (e.g., XML or JSON) before the quality of the data becomes compromised enough to make it unusable. Moreover, whether the data is unusable depends highly on its intended use case. For example, changing even one person's name in a mailing list has commercial consequences, and watermarking could require changing multiple names. So it is not possible to use this field for watermarking purposes in that use case. However, a slight variation on a name could be tolerable if the name is part of a database used for statistical analysis of warranty data.
2. Uniqueness of Watermark. A watermark should be unique to the level of granularity required for the use case. In a commercial system, the watermark is used to assert ownership by a company and identify one individual and company that were the most likely to have leaked the data. So a watermark tied to a company is probably a reasonable level of granularity in this use case. Having a different watermark for every file or clearly-bounded real-time data feed (e.g., XML or JSON) may provide even higher precision, but that increases the size of the system needed to create and detect the watermark. Every increase in scale has an associated cost, and file-level granularity might prove too expensive to be worth the effort when company level watermarking will do. In certain implementations of the invention, the system has the flexibility of applying a highly unique watermark either at the file level or customer level. This is achieved by assigning a Recipient ID to the file or customer, as explained below.
3. Blindness. Ideally, identifying a watermark in a database or text file, or real-time data feed (e.g., XML or JSON) should require neither the knowledge of the original un-watermarked database nor the watermark information. This property is important because it allows the watermark to be detected in a copy of the database even in situations where the original source of the data is unknown. The system presented herein does not require the knowledge of the original un-watermarked database nor the watermark information. Instead, the system processes a suspicious file or data feed (e.g., XML or JSON) acquired from a third party (a "Wild File") to retrieve the watermark if it, in fact, exists in the file. The detected watermark and its corresponding Recipient ID may be matched against the database to retrieve the owner of the watermark.
4. Non-Interference. A file or data feed (e.g., XML or JSON) discovered in the wild may contain data from two or more sources, any of which may have been watermarked. Thus the existence of one watermark should not interfere with the discovery of another watermark in the file or data feed (e.g., XML or JSON). The system is capable of detecting more than one watermark in a file or data feed. The watermark detection process attempts to uncover all possible watermarks and the corresponding Recipient IDs from the Wild File to match back to the watermark database to retrieve the owners of the Wild File.
5. Adequacy for Legal Confirmation of Guilt. Any commercial watermarking system must produce watermarks that can hold up in a court of law. Unique watermarks are a good start. But in a court of law, it may be necessary not only to prove that the watermark belongs to a specific company's files, but also that the watermark retrieved could not be confused with a watermark used for another company. The system outputs the detected watermark(s) along with the Recipient ID(s). The Recipient ID(s) will be matched to the watermark database to ensure that the detected Recipient ID was assigned by the system when the watermark was applied to the file or data feed. In the case where a single watermark is detected, it is highly probable that the owner of the data was found. In the case when multiple watermarks are detected, the information provided by the system will act as a directional lead to potentially discover multiple sources for the data in the file or data feed.

As a result of horizontal salting as set forth herein, the data contained in the Leaked Subset, even if altered, can be identified as having been given to a specific recipient and a particular file the recipient received. This process of identifying the specific Leaked Subset and Bad Actor from a Wild File acquired from a third party is referred to as Guilt Assignment. Guilt Assignment allows the Data Owner to build a strong evidentiary case by which to prosecute the Bad Actor, based on the horizontal salting of the data. The horizontal salting is difficult to detect by the Bad Actor, and thus difficult or impossible for the Bad Actor to remove, even if the Bad Actor is aware that the data has been or may have been salted. The horizontal salting thus reduces the likelihood that a potential Bad Actor will in fact improperly use data that it has acquired in the first place, knowing that such improper use could be detected and result in legal action.

These and other features, objects and advantages of the present invention will become better understood from a consideration of the following detailed description of the preferred embodiments and appended claims in conjunction with the drawings as described following:

BEST MODE FOR CARRYING OUT THE INVENTION

Figure 1:
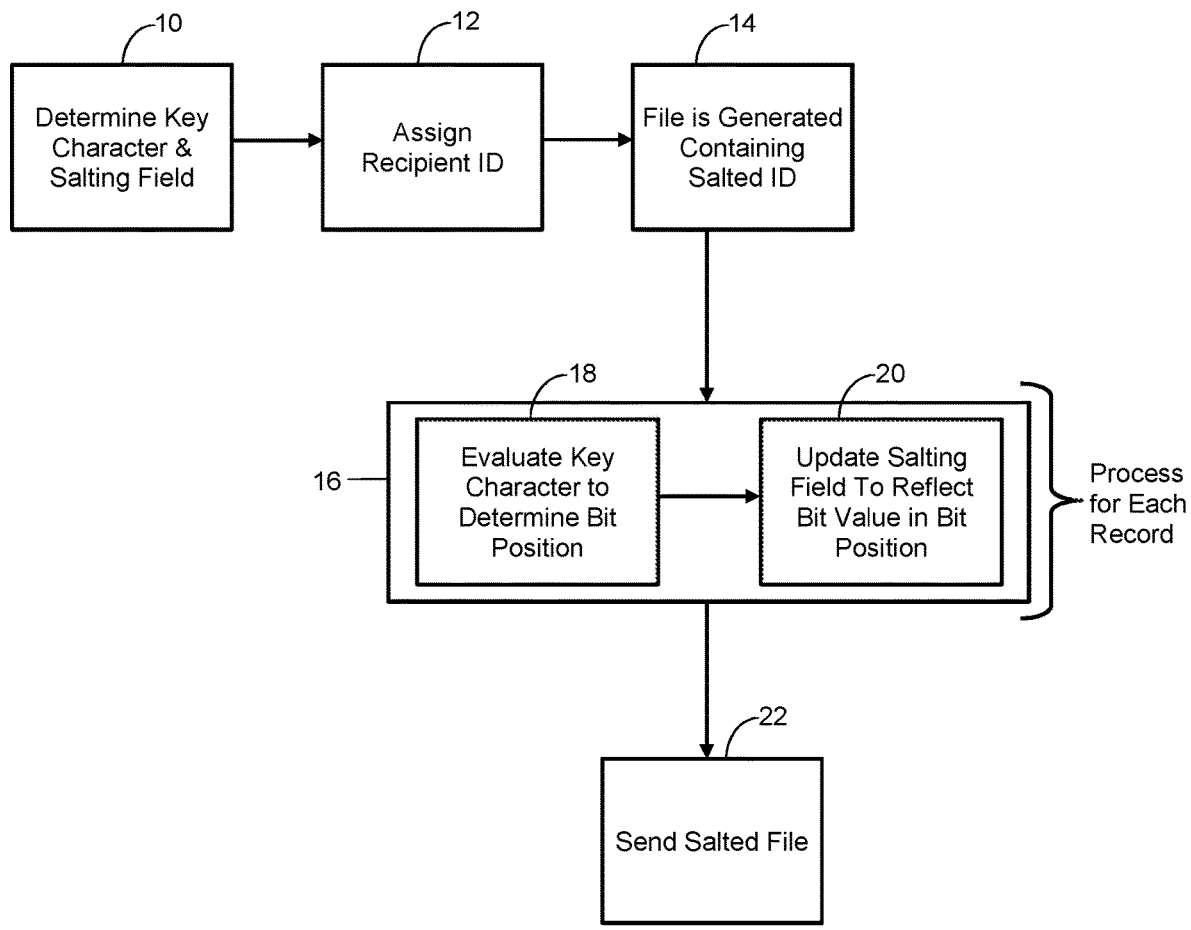
FIG. 1 illustrates the process whereby a Salt is added to a new file or data feed according to an embodiment of the invention.

Before the present invention is described in further detail, it should be understood that the invention is not limited to the particular embodiments and implementations described, and that the terms used in describing the particular embodiments and implementations are for the purpose of describing those particular embodiments and implementations only, and are not intended to be limiting, since the scope of the present invention will be limited only by the claims.

To begin a discussion of certain implementations of the invention, the precise definition of the associated technical statement is presented as follows. Let D be a database, including but not limited to a flat file or data feed, owned by Company C. D consists of tuples in relational form or structured text (e.g., .csv, XML, JSON, or SQL data). Let $S_i$ be a subset of tuples from D. Let M be a unique method to generate W, a representation of D or $S_i$ that is much smaller than D. The goal then is to generate a W such that:

1. W contains a "watermark" for a given M (i.e., M cannot generate the same W for two different Ds or $S_i$s).
2. W can, with statistical confidence, determine that an Agent $A_1$ is a Bad Actor distributing or altering D or $S_1$ versus other Agents $A_2, A_3, \ldots A_n$ who receive a copy of D or a different $S_i$ that partially overlaps $S_1$.
3. W would be sufficiently robust to meet evidentiary standards to prove that D', a second copy or subset of D, was created without the consent of C. This means that the probability of a false negative (identifying D' as being illegitimate when it is not) or a false positive (identifying D' as legitimate when it is not) must be small.
4. W must cause no loss of information from D or $S_i$ at the time they are generated for a specific $A_i$.
5. If M embeds W in D, recovery of W is blind. That is, W can be obtained from D' without knowledge of D if and only if D' and D, or exact duplicate S and S' taken from D and D' respectively, are equivalent.
6. The process by which W is created must be robust enough to deal with significant differences in tuples (e.g., extra blank spaces, data resorting, tuple deletion, tuple addition) between D and D' without generating a false negative.
7. M must take into account that a $D_i$ from C is updated on a regular basis, becoming $D_j$ and allow for the ability to distinguish $D_i$ from $D_j$.
8. M must be computationally feasible with readily available computing equipment.
9. M does not have to identify exactly what changes were made to D or $S_i$ when it becomes D' or $S_i'$, although detailed examination of D' or $S_i'$ can and should provide supporting evidence for W as an indicator of the Bad Actor status of $A_i$.

By implementing the horizontal salting method described herein that meets these requirements, Data Owners can more frequently identify data within a Wild File as having originated from their own data set and even identify to which TTP that data was originally sent. This is done by analyzing certain data elements within the Wild File, to determine if an identifier (the "Salt"), unique to the recipient and subtly embedded in the Leaked Data Set from which some amount of data in the Wild File originated, can be discovered. This Salt cannot be detected without foreknowledge of the salting mechanism as, to the untrained eye, it is invisible.

As noted above, horizontal salting impacts a file or data feed based on two components: a key field and character position within that field, which is evaluated (the "Key Character"); and a salting field, which contains content that can legitimately be in one of at least two states without impacting the usefulness of the data (the "Salting Field"). These components can be the same field or different fields; however, the Key Character cannot be modified by the various states that might be used by the salting method. Ideally, the Key Character should have a wide variety of values, such as the full range of alphanumeric characters. The broader and more equally distributed the values, the better the Key Character will serve its purpose, as explained below.

The different, and yet legitimate, states of the Salting Field might include, for example, variations in the precision of numeric values (e.g., 1.00 versus 1.0), changes to the value of a single bit in a field (e.g. 5.63728 vs. 5.63828), or variations in the use of abbreviations or punctuation (e.g., Jan. 5, 2016 versus Jan. 5, 2016 versus Jan. 5, 2016). A unique identifier, which is assigned to the recipient of the data, is hidden within the data by using the variations of the states in the Salting Field, with the value of the Key Character identifying the position within the unique identifier.

As an example, simplified for illustrative purposes, one recipient out of a very small set of possible recipients might be assigned a unique identifier of 6, represented in binary by the value 0110. Assume that recipient was sent data fields that include Gender and a Height in centimeters, with the Gender field containing possible values of "M", "F", "U", and blank, and with the Height field containing a value with a precision of one hundredth of a centimeter. The first (and only) character in the Gender field could be used as the Key Character, with a value of "M" corresponding to the 1st bit, "F" to the 2nd bit, "U" to the 3rd bit, and " " (blank) to the 4th bit, while the Height field could be used as the Salting Field, with values with a precision to the hundredths indicating a binary value of 0 and a precision to the thousandths indicating a binary value of 1.

In examining a few records from the salted data, the following would be seen:

Gender, Height
M, 183.63
F, 177.420
F, 180.220
, 166.17
M, 179.11
U, 175.130
U, 168.960

In examining the data, it may be seen that the first record holds salting data related to the first bit position (due to it having a value of "M" in the Gender field) and a value of 0 (due to the Height field having a precision to the hundredths). The second record holds salting data related to the second bit position (due to it having a value of "F" in the Gender field) and we learn that the value of the second bit position is 1 (due to the Height field having a precision to the thousandths). Further analysis of the records supports bit values of 0110, and thus we know the file was sent to the recipient assigned that identifier. While this is a simple example, and the salting relatively easily spotted once the mechanism is known, in larger data files with more fields and without the salting mechanism known the Salt can be very difficult to manually identify.

Referring now to FIG. 1, the system for creating a salted file according to an implementation of the invention may be described in greater detail. The provider of this system is referred to as the "Service Provider". At step 10, the Key Character and Salting Field are determined for the file that is to be salted. In the example above, the Key Character is the only character in the gender field and the Height field is used as the Salting Field. This is only one example, and as also noted above many other types of fields could be used for the Key Character and the Salting Field, depending upon the data fields available. Certain types of data records, such as one maintained by a programmatic ad exchange or market research firm, may include hundreds, or even thousands, of data fields for each record pertaining to a consumer or a household; in such cases, there are many candidate fields that may be used for the Key Character and Salting Field, further complicating the task of someone attempting to thwart the salting system.

At step 12, a Recipient ID is assigned to the file. This information is maintained by the Service Provider in a table that matches data pertinent to the file (such as the date of creation, type of data, entity receiving the data, and use for the data) with the Recipient ID in a Recipient ID database.

At step 14, the file is modified with the Salt to result in the Salted File. This process includes an iterative two-step operation (step 16) for each record in the original file or data feed. First, at sub-step 18, the Key Character is evaluated to determine the bit position. Second, the Salting Field in that record is updated to reflect the bit value in bit position at sub-step 20. Once each record is processed at step 18, the Salted File is completed, and may be sent to the customer at step 22. The Salted File may be stored or archived, either by the Service Provider or a third party.

Figure 2:
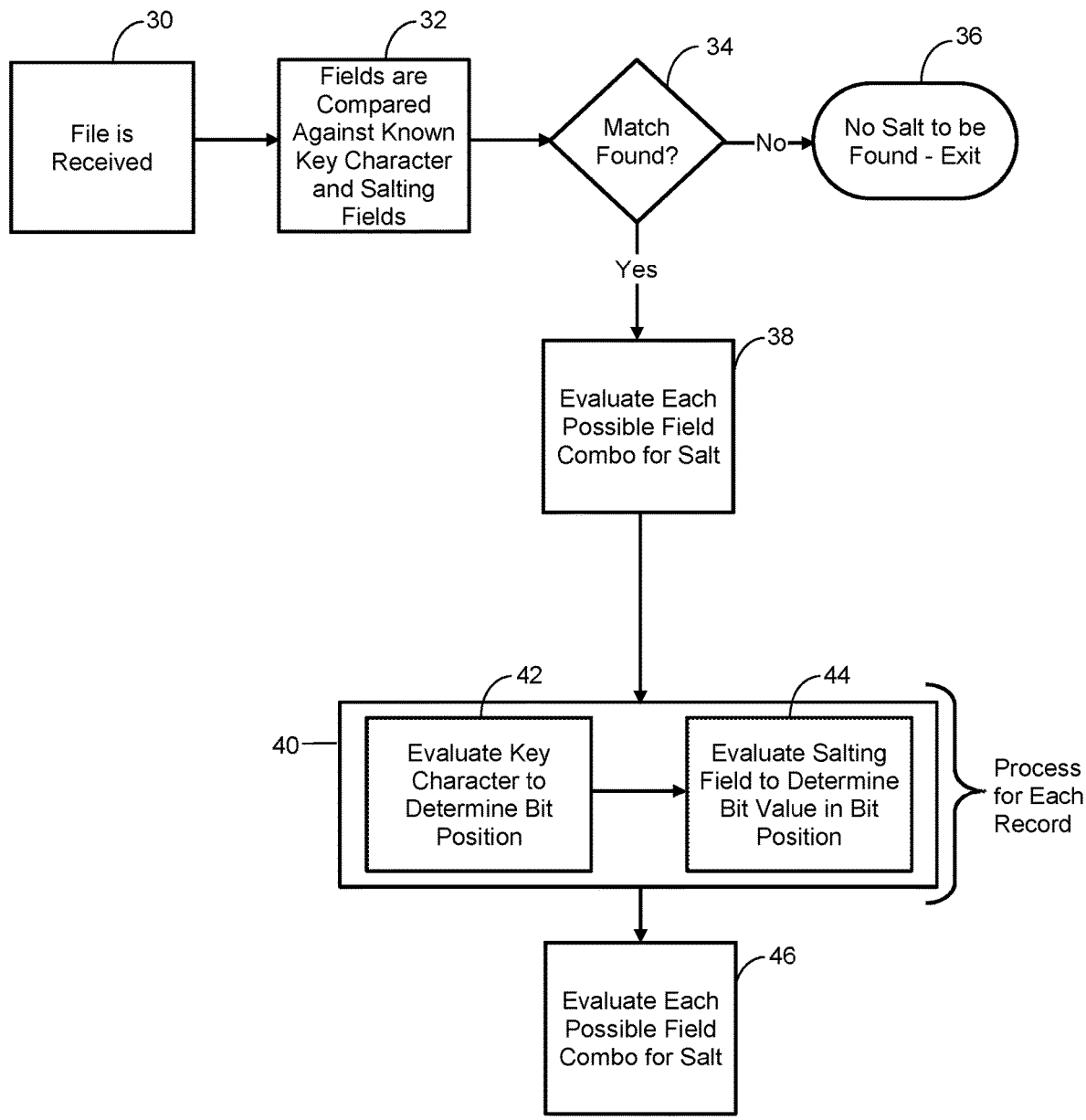
FIG. 2 illustrates the process whereby a file or data feed of unknown origin is analyzed for the presence of a Salt according to an embodiment of the invention.

Referring now to FIG. 2, the process for determining the presence of a salt in a Wild File is described in greater detail. At step 30 the flat file or data feed is submitted to the Service Provider for salt detection, and at step 32 the fields are compared against known key character and salting fields from the data provider's Recipient ID database. This is repeated for all known Recipient IDs, which will account for cases in which a Bad Actor has merged multiple salted files or data feeds. If a match is not found at step 34, then the process ends at step 36, indicating that no salt was found in the file or data feed. If a match is found, then processing continues to evaluate each possible field combination for the salt at step 38. This involves an iterative process, wherein step 40 is performed for each record in the file or data feed, if necessary. Sub-step 42 evaluates the Key Character to determine bit position. Sub-step 44 evaluates the Salting Field to determine bit value in bit position.

Once each record is processed at step 40, the analysis results to determine the presence or absence of the Salt are returned to the Service Provider at step 46. In turn the Service Provider notifies the Data Provider of the result.

Figure 3:
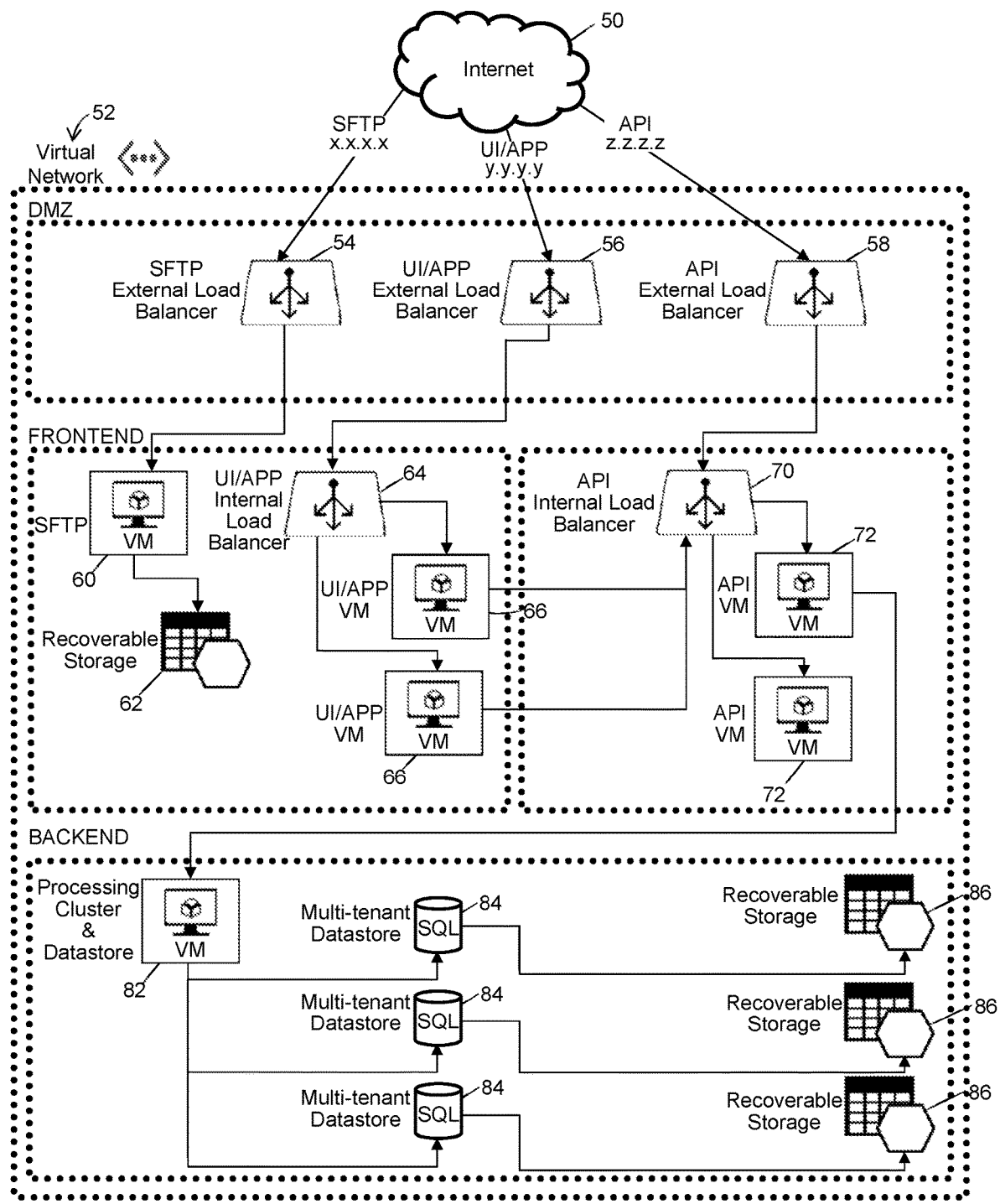
FIG. 3 illustrates the infrastructure and architecture of a salting system according to an embodiment of the invention.

Referring now to FIG. 3, the physical structure for a computer network system to implement the processes described above may now be described. Network 50 (such as the Internet) is used to access the system. A virtual private network (VPN) 52 can be used to provide a secure connection into the "DMZ" area, i.e., the area where outside files or data feeds are quarantined prior to entry behind the system's firewalls. Using a secure file transfer protocol (S FTP) system, files may be transferred to SFTP external load balancer 54; FTP is a well-known network protocol used to transfer computer files between a client and server on a computer network. In addition, data feeds are used to continually stream data into the system through a private protocol or standard protocols (HTTP, HTTPS, etc.) by way of APIs or using customized or standard ports. UI/APP external load balancer 56 may be used to receive files sent by a computer application, and AP external load balancer 58 may be used to receive files or data feeds sent according to an application programming interface (API), which is a well-known concept for developing subroutine definitions, protocols, and tools that allow communications between application software. The load balancers of the system ensure that individual servers in the system are not overloaded with file or data feed requests.

Moving now to the front-end layer of the system, SFTP server 60, associated with its own SFTP server recoverable storage 62, receives files sent by FTP after they pass from the DMZ area. Likewise, UI/APP internal load balancer 64 receives files from the UI/APP external load balancer 56 after they leave the DMZ area, and passes them to one or more UI/APP virtual machines (VMs) 66 (two are shown in FIG. 3). Moving to the services area, these subsystems pass data to API internal load balancer 70, which them passes information to one or more API VMs 72 (again, two are illustrated in FIG. 3).

At the system backend, data from the API VM 72 passes data to processing cluster and datastore 82, which is configured to store data in one or more multi-tenant datastores 84, each of which is associated with a datastore recoverable storage area 86 (three of each are illustrated in FIG. 3). Examples of data stored in multi-tenant datastores 84 include the Recipient IDs and the other data related to the watermarking of each file.

A number of types of attacks were considered in developing and testing the system described herein. Included among those are the following:

1. Benign Update. The marked data may be added, deleted, or updated, which may remove the embedded watermark or may cause the embedded watermark to become undetectable.
2. Subset Attack. Deleting or updating a subset of the data.
3. Superset Attack. Some new data or attributes are added to a watermarked database that can affect the correct detection of the watermark.
4. Collusion attack. This attack requires the attacker to have access to multiple watermarked copies of the same file or data feed.

Three test scenarios were used to test effectiveness against these attack categories. In a first scenario, a delete was employed (testing the likelihood of detecting a salt by removing a number of records from a salted file). This is relevant to the subset and benign attacks. In a second scenario, an insert was employed (testing the insertion of a varying number of unsalted records randomly inserted into the data file of feed). This is relevant to the benign and superset attacks. In a third scenario, a mixed Recipient ID test was employed (testing the likelihood of detecting the salt by combining salted records generated from more than one Recipient ID). This is relevant to the collusion attack.

In the first scenario, the following steps were performed:
1. Take a random sample of 100K records from a specific database file D. This file is referenced as the Data File.
2. Use one Recipient ID of length $L_T$ to horizontally salt the full Data File.
3. Reduce the number of records in the Data File by randomly removing 10K records. This file is referenced as the Wild File.
4. Detect and record the number of Recipient ID bits present in the Wild File.
5. If the number of Recipient ID Bits equals $L_T$, repeat step 3 and 4 otherwise go to step 6.
6. Reduce the number of records in the Data File by randomly removing 1K records.
7. Detect and record the number of Recipient ID bits present in the Wild File.
8. If the number of records in the Wild File is greater than 1K then repeat step 6 and 7, otherwise go to step 9.
9. Reduce the number of records in the Data File by randomly removing 500 records.
10. Detect and record the number of Recipient ID bits present in the Wild File.
11. Reduce the number of records in the Data File by randomly removing 400 records.
12. Detect and record the number of Recipient ID bits present in the Wild File.

The results of this test were as shown in Table 1:

TABLE 1

| No. of Records | % of $L_T$ Recipient ID Bits Matched |
|---|---|
| 20,000+ | 100% |
| 20,000 | 100% |
| 10,000 | 100% |
| 9,000 | 94.44% |
| 8,000 | 94.44% |
| 7,000 | 94.44% |
| 6,000 | 88.89% |
| 5,000 | 86.11% |
| 4,000 | 80.05% |
| 3,000 | 77.77% |
| 2,000 | 77.77% |
| 1,000 | 69.44% |
| 500 | 63.89% |
| 100 | 58.33% |

It may be seen that for a wild file of size greater than 10 k records, the percent of Recipient ID bits identified and matched was 100%, which in our test protocol using a specific Recipient ID of length $L_T$, results in a uniqueness significantly greater than 1 in 10 B and thus a confidence interval of effectively 100%. In the case of a wild file of size 100 to less than 10 k records, the number of Recipient ID bits identified and matched was between 58.33% and 94.44%, which results in a uniqueness of greater than 1 in 3 MM, and thus a confidence interval of greater than 99%. Even in the case of a very small wild file of size 100 records, the percent of Recipient ID bits identified and matched was 58.33%, resulting in a uniqueness greater than 1 in 2 MM and thus a confidence interval of about 99%. The test result illustrates that 10K is the minimum file size for all Recipient ID bits to be identifiable. When all Recipient ID bits are identified, the confidence interval is 100% that the wild file contains the horizontal salt, because a Recipient ID of length $L_T$ in this test was designed to give a uniqueness of significantly greater than 1 in 10 B. As the file size falls below 10K, the number of Recipient ID bits decreases; however, the test shows that the system can still identify 58.33% of the Recipient ID bits with as few as 100 records in a wild file. The identification of 58.33% of Recipient IDs represents greater than 1 in 2 MM, which results in an extremely high confidence interval close to 99%. The implication thus pertains to system processing and scalability, because the system does not need to process a full file in order to assign guilt. It is sufficient to process incremental records in batches of 100 until the system identifies 58% of the elements in the Recipient IDs.

In the second scenario, the following steps were performed:
1. Generate 5,000 Recipient IDs of length $L_T$ to simulate the estimated maximum number of customer accounts at any given time.
2. Take random samples of 5K, 50K, and 100K from a specific database file D. These files are referenced as Data File 1, Data File 2 and Data File 3.
3. Randomly select one of the Recipient IDs in step 1 to horizontally salt each Data File completely.
4. Insert 1% (relative to the Data File size) unsalted records randomly selected from D for Data File 1, Data File 2 and Data File 3. These files are referenced as Wild File 1, Wild File 2 and Wild File 3.
5. Detect and record the number of Recipient ID bits present in the Wild Files.
6. Repeat step 3 by inserting 20%, 40%, 60% and 80% of unsalted records randomly selected records.
7. Detect and record the number of Recipient ID bits present in the Wild File at each interval.

The results of this test were as shown in Table 2:

TABLE 2

| Wild File Size | Insertion % | % of $L_T$ Recipient ID Bits Matched |
|---|---|---|
| 5K | 1% | 86.11% |
| | 20% | 88.89% |
| | 40% | 100% |
| | 60% | 100% |
| | 80% | 100% |
| 50K | 1% | 100% |
| | 20% | 100% |
| | 40% | 100% |
| | 60% | 100% |
| | 80% | 100% |
| 100K | 1% | 100% |
| | 20% | 100% |
| | 40% | 100% |
| | 60% | 100% |
| | 80% | 97.22% |

Based on the high number of Recipient ID bits identified (greater than 86%) across the test files as observed from the test results shown in Table 2 above, the test results illustrates a high confidence level of greater than 99% that the system can detect the horizontal salt against random record insertion across varying wild file size and insertion percentages.

In the third scenario, the following steps were performed to test the ability of detecting the salt generated by two, three, and five Recipient IDs with an unknown number of salted records from any Recipient ID. The approach was to simulate the scenario where there are five thousand clients by generating five thousand Recipient IDs of length $L_T$:
1. Generate 5,000 Recipient IDs to simulate the estimated maximum number of customer accounts at a given time.
2. Take two random samples each of 100K records from a standard database file D. These files are denoted Data File 1 and Data File 2.
3. Use one of the 5,000 Recipient IDs to horizontally salt the full Data File 1.
4. Use a second Recipient ID randomly selected from the 5,000 Recipient IDs in step 1 to horizontally salt the full Data File 2.
5. Insert 10K (10% of original Data File size) of unsalted records randomly selected from D.
6. Detect and record the number of Recipient ID bits present in the Wild File using confidence intervals: 100%, 80%, 70% and 60%. At 100%, the Recipient ID bit, that is either 1 or 0, is determined by the fact that the bit is mapped to the same bit 100% of the time. At 80% the Recipient ID bit is determined by the fact that the bit is mapped to the same bit at least 80% of the time. The rest of the intervals, 70% and 60%, follow the same rule.
7. Detect and record the number of Recipient ID bits present in the Wild File for each interval in step 6.

The results of performing these steps are shown in Table 3:

TABLE 3

| No. of Recipient IDs | Conf. Intrvl. | % of $L_T$ Recipient ID Bits Matched | Identified Recipient IDs | Uniqueness |
|---|---|---|---|---|
| 2 | 100% | 47.22% | 2 (Matched) | >1 in 100,000 |
| | 80% | 47.22% | 2 (Matched) | |
| | 70% | 47.22% | 2 (Matched) | |
| | 60% | 50% | 0 | |

TABLE 3-continued

| No. of Recipient IDs | Conf. Intrvl. | % of $L_T$ Recipient ID Bits Matched | Identified Recipient IDs | Uniqueness |
|---|---|---|---|---|
| 3 | 100% | 27.78% | 10 (all 3 Recipient IDs) | >1 in 1,000 |
|   | 80%  | 27.78% | 10 (all 3 Recipient IDs) |   |
|   | 70%  | 44.44% | 0 |   |
|   | 60%  | 100%   | 0 |   |
| >3 | All | >1,000 | Unsupported |   |

The test result illustrates that the system can fully identify all Recipient IDs when a Wild File was a result of merging two salted data files with two distinct Recipient IDs. The system is highly effective as it narrows down to 10 potential Recipient IDs (out of 5,000 in this example), which contains all three Recipient IDs present in the wild file. When the number of Recipient IDs exceed three, the test shows that there are too many possible Recipient IDs being identified, which may not be effective for an automated system; however, it is believed that it is highly improbable for a Bad Actor to merge more than two salted data files from the same data provider in real life.

As an overall conclusion from this testing, it may be seen that the Horizontal Salting mechanic easily survived common attacks where records were inserted or deleted, as well as when files were merged. Specifically, the test results proved that the system can identify Recipient IDs with >99% confidence under most insert/delete scenarios; identify Recipient IDs with about 99% confidence with as few as 100 records; identify two Recipient IDs with 100% confidence under merge attacks when a wild file contains two Recipient IDs; and eliminate 99.8% of all Recipient IDs when a wild file contains 3 Recipient IDs, in so doing increasing the computational speed and efficiency of this digital watermarking process.

It may be seen that the described implementations of the invention result in a unique method for determining the recipient of a given data file or feed without making the recipient aware or disrupting the usefulness of the data. In addition, the system is scalable, able to identify the uniqueness of a file or data feed and its recipient amongst a set of potentially millions of Wild Files in circulation, while also providing security for the data ingested by the system. In order to be practical, a commercial-grade watermarking system must be able to process hundreds of files per day, meaning that the entire processing infrastructure must be expandable and scalable. In this age of big data, the size of data files or feeds to be processed ranges significantly, from a few megabytes to several terabytes in size, and the way in which these files or feeds flow into the system can be very unpredictable. In order to construct scalable systems, one must build predictive models to estimate maximum processing requirements at any given time to ensure the system is sized to handle this unpredictability.

The salting system according to the implementations described herein has the capacity of salting data files, database tables, and data feeds of unlimited size. Processing speed, however, is also important, since customers cannot wait days or weeks for watermarking to occur before files are delivered. They may be releasing updates to their underlying data every day and perhaps even faster. The system must be capable of watermarking a file within the cycle time of production of the next file, or else the system will bottleneck and files will fall into a queue that will cause the entire business model to break down. The baseline release was designed to have a minimum processing throughput of 10K records in less than 2 seconds. On average the salt detection process requires processing less than 0.01% of any given Wild File in order to determine the presence of watermark. The processing time to detect the watermark in the baseline release is a few seconds. Computing power in most cases is reduced because it is not necessary to parse the complete file and then match the Wild File to the master database to determine whether the Wild File is stolen, except in the worst-case scenario. In addition the search space is further reduced, thus improving processing time, as the detected watermark related to a Recipient ID is only required to match against the Recipient IDs stored in the database. Note, however, that it may be necessary to parse the entire Wild File to ensure that it is not watermarked with multiple Recipient IDs. Regardless, human interaction and examination is not required as part of salt detection using this system. For this reason, further time and cost savings are realized and errors are reduced.

Almost all of the research on data watermarking has been based on algorithms tested for one or two owners of data, and one or two Bad Actors. A commercial-grade system must be able to generate, store and retrieve watermarks for numerous customers and an unknown number of Bad Actors in situations where files with completely unknown sources are recovered. For example, consider that a commercial watermarking company has 5,000 customers for whom it watermarks files. In this example, the watermarking company retrieves a file from a third party who would like to validate that the file contains no stolen data. To determine this, the watermarking company must test the file against each company's watermark until it finds a match. In the worst case, it does not find a match after testing 5,000 times, in which case the only assertion that can be made is that the data has not been stolen from any of the 5,000 owners in the system. The system, according to certain embodiments, does not have limitations to the number of customers and the system is capable of supporting an infinite number of system-generated unique Recipient IDs represented in the watermark.

Horizontal salting is a robust mechanism that only requires as few as 100 random records to prove data ownership as opposed to parsing and processing millions of records. In the example of Acxiom a typical file contains hundreds of millions of records. Taking an example of 500 MM records, this mechanism improves detection by 100/500 MM (or 5 MM times) in the best case scenario. Under the current system infrastructure we benchmarked salt detection between file sizes with records from 4,752 to 1 Million (Table 4) under the (worse case) scenario that the system has to read and process all the records in the file (full scan). The average rate of salt detection processing is 0.00084984681 second per record. A file with 1 Million records takes 6.96 minutes for salt detection in the worst-case, full scan scenario. As the salt applied by this mechanism is invisible, it is impractical and impossible for manual salt identification without any advanced signal processing mechanic that can extract signals out of the noise within a timeframe deemed practical and usable by any business.

TABLE 4

| File | Record Count | Elapsed Time (Seconds) | Average Time per Record (Second) |
|---|---|---|---|
| File 1 | 4752 | 11 | 0.00231481481 |
| File 2 | 38291 | 19 | 0.00049620015 |
| File 3 | 46956 | 8 | 0.00017037226 |

TABLE 4-continued

| File | Record Count | Elapsed Time (Seconds) | Average Time per Record (Second) |
|---|---|---|---|
| File 4 | 1000000 | 418 | 0.00041800000 |
| | | Average Time per Record (Second) | 0.00084984681 |

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for determining whether a wild data file is a leaked data file, wherein the wild data file comprises a plurality of records, and wherein each of the records comprises at least one field, the method comprising the steps of:
    a. for a Recipient ID record stored in a Recipient ID database, reading a key field, a numeric value, and a salting field from the Recipient ID database that is associated with the Recipient ID;
    b. identifying the key field in at least one of the records of the data file, wherein the key field contains one of a plurality of key data values;
    c. associating the numeric value with a corresponding key data value;
    d. identifying the salting field in at least one of the records of the data file;
    e. for at least one of the records in the data file, checking for the presence of a salt in the salting field based on the numeric value associated with the key data value in the key field; and
    f. returning an indicator of whether the salt was found and associating the indicator with the Recipient ID.

2. The method of claim 1, wherein each of the steps are repeated for a plurality of Recipient IDs in the Recipient ID database.

3. The method of claim 1, wherein each of the steps are repeated for all of the Recipient IDs in the Recipient ID database.

* * * * *